United States Patent Office 3,270,049
Patented August 30, 1966

3,270,049
N-(TRICHLOROMETHYLTHIO)HEPTASULFUR-
IMIDE AND PROCESS THEREFOR
John J. Kohler, Branford, and Louis A. Ross, New Haven,
Conn., assignors to Olin Mathieson Chemical Corporation, New Haven, Conn., a corporation of Virginia
No Drawing. Filed Apr. 29, 1964, Ser. No. 363,595
5 Claims. (Cl. 260—551)

This invention relates to the preparation of a sulfur substituted sulfenamide, and more specifically it relates to the preparation of N-(trichloromethylthio)heptasulfurimide having the formula:

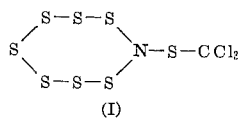

(I)

Heptasulfurimide ($S_7NH$) is a known cyclic compound prepared by the reaction of ammonia and sulfur monochloride as disclosed in, for example, British Patent 544,577 and German Patent 1,060,851. It has been reported that organic derivatives of $S_7NH$ can be provided by replacement of the imide hydrogen atom with various groups. For instance, the hydrogen atom was replaced by acyl groups to provide derivatives of the type $S_7NCOR$ as described by Colchester et al. in J. Chem. Society., 4918 (1963). However, the preparation of a sulfenamide derivative of heptasulfurimide has not been previously reported. Thus, the principal object of this invention was to prepare heptasulfurimide derivatives of this nature. Another object was to provide a process for the preparation of these sulfur substituted sulfenamides.

The preparation of the sulfur substituted sulfenamide (I) has been accomplished in accordance with this invention. Furthermore, a convenient process is disclosed herein for the preparation of N-(trichloromethylthio) heptasulfurimide in high purity and good yield.

The reaction of a number of sulfenyl chlorides with heptasulfurimide was undertaken in an attempt to provide novel sulfenamides in accordance with the following equation.

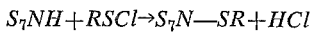

It has been found that $S_7NH$ does not react with any of a variety of sulfenyl chlorides unless an organic base which will act as a hydrogen chloride acceptor is present in the reaction mixture. Even when the required organic base is utilized in the reaction of heptasulfurimide with a sulfenyl chloride, all attempts to prepare the desired sulfenamides were uniformly unsuccessful with one exception. For example, when heptasulfurimide was reacted with tetrachloroethyl sulfenyl chloride, p-chlorophenyl sulfenyl chloride and phenyl sulfenyl chloride in the presence of a tertiary amine, only sulfur and other decomposition products were obtained. Similarly, when heptasulfurimide was reacted with p-nitrophenyl sulfenyl chloride and 2,4-dinitrophenyl sulfenyl chloride in the presence of triethylamine and pyridine respectively, only trace yields of the desired sulfenamides were obtained.

Now however it has been found that heptasulfurimide reacts with trichloromethyl sulfenyl chloride under similar reaction conditions to provide N-(trichloromethylthio) heptasulfurimide of high purity. A good yield of the pure product has been obtained, and the process for the preparation of this derivative disclosed herein is surprisingly convenient considering the poor results obtained in the reaction of $S_7NH$ with other sulfenyl chlorides.

As mentioned in the preceding discussion, it is necessary that an organic base which will function as a hydrogen chloride acceptor be utilized in the preparation of N-(trichloromethylthio)heptasulfurimide. The tertiary amines are preferably employed as the required bases. Suitable tertiary amines which may be utilized in the practice of this invention include trialkyl amines such as triethyl amine, etc.; and other tertiary amines such as pyridine, N-lower alkyl morpholines and the like. In general because of their availability, tertiary amines having less than thirteen carbon atoms are preferably employed. It is desirable to utilize at least an equimolar amount of the tertiary amine based on molar amount of heptasulfurimide reactant.

An organic solvent must be used in the preparation of the sulfur substituted sulfenamide (I). Any solvent which is inert to the reactants may be employed, and thus a wide variety of solvents are suitable for use in the process. Carbon disulfide is a particularly useful solvent, but other suitable solvents include chloroform, carbon tetrachloride, ethyl ether, benzene, toluene, methylene dichloride and the like.

The sulfenamide (I) may be prepared at temperatures as high as the solvent boiling points if desired, but it is preferred to operate at a temperature level below about 30° C. Even more preferably, a reaction temperature range of about —10° C. to about 10° C. should be used in the process disclosed herein.

The following example will serve to illustrate the preparation of N-(trichloromethylthio)heptasulfurimide in accordance with the process of this invention.

Example 1

A 500 ml. round bottom flask equipped with a magnetic stirrer, addition funnel and reflux condenser fitted with a $CaSO_4$ drying tube was charged with 150 ml. dry $CS_2$ and 20.4 g. (0.11 mole) of trichloromethyl sulfenyl chloride and then cooled to 0° C. A solution of 23.9 g. (0.11 mole) of heptasulfurimide, 12.6 g. (0.124 mole) of triethyl amine, and 150 ml. of dry $CS_2$ was added via the addition funnel over a period of 45 minutes to the slowly stirred solution in the flask. Reaction began immediately on mixing. After the addition was completed, the system was stirred for an additional hour at 0°–10° C. The mixture was then filtered to remove the amine hydrochloride and the $CS_2$ removed, under reduced pressure, from the filtrate to give a thick paste. The paste was redissolved in the minimum amount of dry $CS_2$ at room temperature, and upon the slow addition of ethanol to this solution, an oil separated out. When it appeared that the oil had ceased to separate, the supernatant liquid was removed by decantation. Then the addition of further ethanol to the supernatant liquid precipitated from solution a yellow microcrystalline solid which was isolated by filtration, washed with cold ethanol and dried. This product melted at 122° C. with decomposition. The following analytical data revealed that N-(trichloromethylthio)heptasulfurimide had been obtained. Yield: 41.7%.

*Analysis.*—Calcd. for $CCl_3SNS_7$: C, 3.08; N, 3.60; Cl, 27.41; S, 65.89. Found: C, 3.04; N, 3.64; Cl, 27.1; S, 65.58.

The heretofore unreported N-(trichloromethylthio) heptasulfurimide is a biologically active derivative, and it is particularly useful as a foliar fungicide. The following procedure will serve to illustrate the effectiveness of this derivative as a foliar fungicide.

Aqueous suspensions containing 500 p.p.m. of the N-(trichloromethylthio)heptasulfurimide were sprayed on tomato, cucumber and bean plants, and the plants were allowed to dry. The plants were then sprayed with suspensions, respectively, of spores of the pathogens *Alternaria solani, Erisyphe cichoracearum,* and *Uromces phaseoli typica.* The host plants were allowed to grow under controlled greenhouse conditions for periods ranging from 2–5 days and were periodically examined for indications of tomato early blight, cucumber powdery mildew and bean rust diseases. In each case, there was a significant disease control in those plants treated with the substituted heptasulfurimide as compared to other plants treated in a similar fashion but with no active ingredient. Furthermore, the active ingredient is not phytotoxic.

What is claimed is:
1. N-(trichloromethylthio)heptasulfurimide.
2. A process for the preparation of N-(trichloromethylthio)heptasulfurimide which comprises reacting heptasulfurimide with trichloromethyl sulfenyl chloride at a temperature range of about −10° C. to about 30° C. in the presence of a tertiary amine and in an inert organic solvent, said tertiary amine having less than 13 carbon atoms and being utilized in at least an equimolar amount based on molar amount of heptasulfurimide reactant.
3. The process of claim 2 wherein a trialkyl amine is utilized as the tertiary amine.
4. The process of claim 2 wherein carbon disulfide is employed as the solvent.
5. The process of claim 2 wherein a reaction temperature range of about −10° C. to about 10° C. is employed.

No references cited.

WALTER A. MODANCE, *Primary Examiner.*

HARRY I. MOATZ, *Assistant Examiner.*